Dec. 18, 1928.
C. F. JENKINS
1,695,980
LIGHT CONVERGING LENS SYSTEM
Filed June 5, 1925
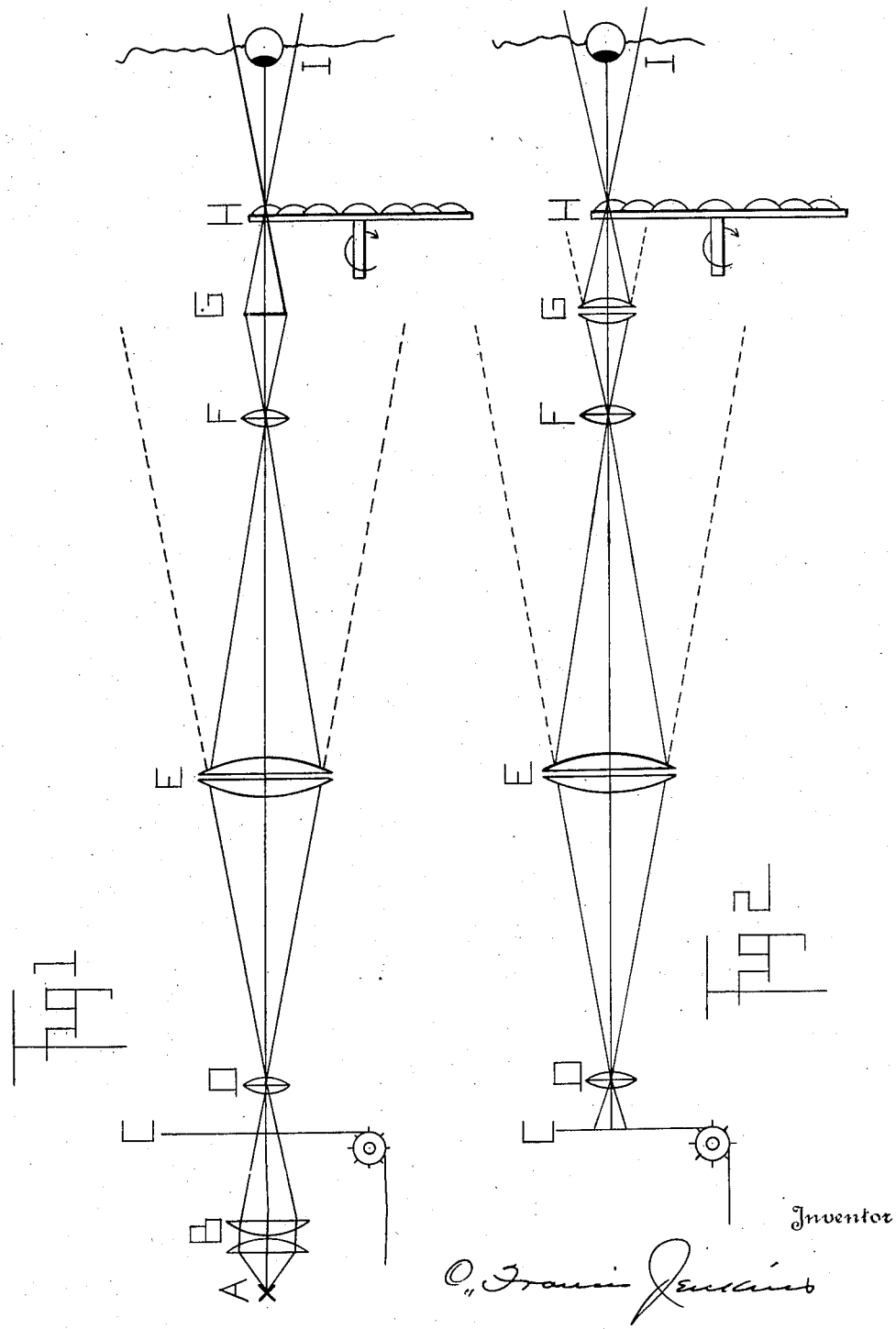

Patented Dec. 18, 1928.

1,695,980

UNITED STATES PATENT OFFICE.

CHARLES FRANCIS JENKINS, OF WASHINGTON, DISTRICT OF COLUMBIA.

LIGHT-CONVERGING-LENS SYSTEM.

Application filed June 5, 1925. Serial No. 35,118.

This invention relates to apparatus for the transmission of motion pictures by radio, and has for its principal object means for increasing the effective light value of the illuminated picture.

In all methods of transmitting pictures electrically, where a light-sensitive cell is employed, the time required to analyze each picture, and convert it into corresponding electrical values, depends very largely on the sensitivity and maximum response of the cell.

With a given cell, however, there are but two factors which may be changed; one is the strength of the picture light, and the other is the total time of scanning the picture. With a still picture either the time or the light may be changed, for the picture is recorded on a photographic plate, and full exposure may be had by changing either time or light, or both together.

But in motion pictures the light only can be changed, for the picture is recorded on the eye, and the time for each picture is, therefore, limited by persistence of vision, say, fifteen or sixteen discrete pictures per second. So, with light the only variable factor, every possible means must be employed to effectively utilize the available light; for just a little additional light strength added by some new means may make the cell operate, when it would not operate with the light handled in the usual way.

With this and other objects in view the invention consists in the novel details of assembly of the various elements employed, hereinafter disclosed, and particularly pointed out in the claims.

In the drawings Fig. 1 is a schematic illustration of the optical system with this new means for increasing effective light values, applied in a single place; and Fig. 2 an illustration of the same means applied in two places in the optical system.

In both figures like symbols refer to like elements, in which A is a source of light; B a pair of condensers; C a picture film; D an objective lens for imaging each picture frame of the film, in succession, at a point between the plano-convex lenses E. F is a second objective for picking up the image at E and re-imaging it at G. The lenses on the lens carrier H, in turn as they come into the line with the light beam by reason of the rotation of the lens-carrier, causes the picture image, the third image, to sweep across the light-sensitive cell I.

The picture-laden light is indicated by solid lines from the film C to the light cell I, while the extension of the light-beam, if lenses E were removed, is indicated by dotted lines.

The foci of lens D, and perhaps lens F, are involved in this method for increasing the strength of the light falling on the light cell I.

It is believed to be obvious that if the forward focus of the lens D, and the backward focus of the lens F, are both sharp at a point between the lenses E, then the lens F will pick up the aerial image projected by lens D, and pass it on to a focus at G, and the lenses E have absolutely nothing whatever, practically, to do with the sharpness or focal position of the picture passing therethrough.

But the amount of light passing through the lens F is tremendously increased by the location of the lenses E at the common focal plane of lenses D and F, an increase which is almost as the ratio of the squares of the diameter of the lens F and the diameter of the extended light cone in the same plane, i. e., the plane of the lens F. For if the lens E were removed a very great percentage of the light would be lost by the extended projection of the light cone (as indicated by dotted lines), while if a ground glass is employed at this point, light would be lost by diffusion.

The above description of the light-concentrating effect of the location of a lens at E applies equally to the location of a lens or lens combination at G (Fig. 2) so that a repetition of the description applying to this lens also is not believed required.

It is also understood that other interchangeable optical means may be employed in place of the lenses shown, without departing from the spirit of my invention.

What I claim, is—

1. The combination of means for forming an image of an object, means for giving linear movement to said image, means for forming an image of said first image, means for giving linear movement to said second image a plurality of times and at approximately right angles to the movement of said first image, a light sensitive cell located to be swept by said second image, and a convex lens located in the plane of the first image, and being adapted to cause more of the imaging light to be projected through the second image forming means and to the light sensitive cell without affecting the focusing operation of the first and second image forming means.

2. The combination of means for forming an aerial image of an object, means for giving linear movement to said image, means for forming an aerial image of said first image, and means for giving linear movement to said second image a plurality of times and in a direction approximately at right angles to the movement of said first image, and a convex lens located in the plane of the first image and adapted to cause more of the image light to be projected through the second image forming means without affecting the focusing operation of the first and second image forming means.

3. The combination of means for forming an image of an object, means for giving linear movement to said image, means for forming an image of said first image, and means for giving linear movement to said second image a plurality of times, and in a direction approximately at right angles to the movement of said first image, and a convex lens located in the plane of the first image and adapted to cause more of the image light to be projected through the second image forming means without affecting the focusing operation of the first and second image forming means.

4. The combination of means for forming an image of an object, means for giving movement to said image, means for forming an image of said first image, and means for giving movement to said second image in a direction approximately at right angles to the movement of said first image, and a convex lens located in the plane of the first image and adapted to cause more of the image light to be projected through the second image forming means without affecting the focusing operation of the first and second image forming means.

5. The combination of a motion picture film, means for moving said film longitudinally, means for forming an image of the picture frames on said film, means for forming an image of said first image, means for giving linear movement to said second image a plurality of times and at right angles to the movement of said film, and a convex lens located in the plane of the first image and adapted to project more of the image light through the second image forming means without affecting the focusing operation of the first and second image forming means.

6. The combination of a motion picture film, means for moving said film longitudinally, means for forming an image of the picture frames on said film, means for forming an image of said first image, means for giving linear movement to said second image a plurality of times and approximately at right angles to the movement of said film, a light-sensitive cell located to be swept by second image, and a convex lens located in the plane of the first image and adapted to project more of the image light through the second image forming means and to the light sensitive cell without affecting the focusing operation of the first and second image forming means.

7. The combination of a motion picture film, means for giving longitudinal movement to said film, a lens for imaging the picture frame on said film, a rotating carrier having a plurality of lenses thereon each of which in succession move across the optical axis of said first lens, and a lens located in the image plane of said first lens and adapted to cause more of the image light to be projected to the rotating carrier without affecting the focusing operation of the first lens or the lenses of the first and second image forming means.

8. The combination of, means for forming an image of an object, means to form an image of said image, means for moving said second image forming device to cause said second image to move, a light translating device located to be traversed by said second image, and a lens located in the plane of said first image and adapted to cause more of the image light to be projected through the second image forming means and to the light translating device without affecting the focusing operation of the first and second image forming means.

9. The combination of means for forming an image of an object, means for forming an image of said first image, means for forming an image of said second image, means for moving said third image forming device to cause said third image to move, a light translating device located to be traversed by said third image, and a lens located in the plane of the said first image and adapted to cause more of the image light to be projected through the second image forming means and to the light translating device without affecting the focusing operation of the first and second image forming means.

10. The combination of means for forming an aerial image of an object, means for giving linear movement to said image, means for forming an aerial image of the first image, means for giving linear movement to the second image a plurality of times and in a direction approximately at right angles to the movement of the first image, a light receiving surface arranged to be swept by the second image, and a convex lens located in the plane of the first image and adapted to cause more of the light image to be projected through the second image forming means and to the light receiving surface without affecting the focusing operation of the first and second image forming means.

11. The combination of means for forming an image of an object, means for giving linear movement to said image, means for forming an image of the first image, means for giving linear movement to the second image a plurality of times and in a direction approximately at right angles to the movement of said first image, a light receiving surface arranged to be swept by the second image, and a convex lens located in the plane of the first image and adapted to cause more of the image light to be projected through the second image forming means and to the light receiving surface without affecting the focusing operation of the first and second image forming means.

In testimony whereof I have affixed my signature.

CHARLES FRANCIS JENKINS.